United States Patent
Jennings et al.

(10) Patent No.: US 6,442,752 B1
(45) Date of Patent: Aug. 27, 2002

(54) METHOD, APPARATUS, AND COMPUTER PROGRAM PRODUCT FOR REPLACING A DYNAMIC LINK LIBRARY (DLL) OF A FIRST COMPUTING ENVIRONMENT WITH A DLL OF A SECOND COMPUTING ENVIRONMENT THAT CAN BE INVOKED FROM THE FIRST COMPUTING ENVIRONMENT IN A TRANSPARENT MANNER

(75) Inventors: Andrew T. Jennings, West Chester; G. Lawrence Krablin, Downingtown; Timothy Neilson Fender, Berwyn; William Stratton, Malvern, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/383,497

(22) Filed: Aug. 26, 1999

(51) Int. Cl.[7] .................................................. G06F 9/44
(52) U.S. Cl. ........................................ 717/162; 709/331
(58) Field of Search ................................. 717/162, 163, 717/164, 165, 166, 167, 168, 169, 170, 171, 172, 173; 709/331, 332, 220, 221, 225, 231, 232, 328, 330; 703/23–28

(56) References Cited

U.S. PATENT DOCUMENTS

| | | | | |
|---|---|---|---|---|
| 5,574,854 A | * | 11/1996 | Blake et al. ................... | 714/28 |
| 5,634,114 A | * | 5/1997 | Shipley ........................ | 717/170 |
| 5,673,315 A | * | 9/1997 | Wolf ........................... | 717/163 |
| 5,916,308 A | * | 6/1999 | Duncan et al. ............. | 709/305 |
| 5,946,486 A | * | 8/1999 | Pekowski .................... | 717/128 |
| 6,003,095 A | * | 12/1999 | Pekowski et al. ........... | 717/163 |
| 6,006,278 A | * | 12/1999 | Cottrill ....................... | 709/200 |
| 6,233,731 B1 | * | 5/2001 | Bond et al. .................. | 709/328 |
| 6,298,481 B1 | * | 10/2001 | Kosaka et al. .............. | 717/110 |

OTHER PUBLICATIONS

Dynamic Interception of Imported Procedure Calls. IBM Technical Disclosure. 1996. pp. 197–202.*

Nakajima et al. ConverStation/2: An Extensible and Customizable Realtime Multimedia Conferencing system.*

* cited by examiner

Primary Examiner—Gregory Morse
Assistant Examiner—Wei Zhen
(74) Attorney, Agent, or Firm—Lisa A. Rode; Michael B. Atlass; Mark T. Starr

(57) ABSTRACT

A first dynamic link library (DLL) of a first computing environment, which exports one or more procedures that an application program executing in the first computing environment can call, is replaced with a second DLL that executes in a second computing environment, in a manner that is transparent to the calling application. A source code skeleton of the second DLL is automatically generated based on information contained in a directory of the compiled object code of the first DLL. The exported procedures of the second DLL have interfaces that are identical (from the perspective of the calling application) to the interfaces of the corresponding exported procedures of the first DLL, but the exported procedures of the second DLL comprise native code of the second computing environment. The calling application executing in the first computing environment is the linked dynamically to the exported procedures of the second DLL in the second computing environment in a manner that is transparent to the calling application.

14 Claims, 16 Drawing Sheets

```
200  BEGIN
201   BOOLEAN PROCEDURE TYPED PROCEDURE (BOOLEAN_PARAM, INTEGER_PARAM);
202    VALUE BOOLEAN_PARAM, INTEGER_PARAM;
203    BOOLEAN BOOLEAN_PARAM;
204    INTEGER INTEGER_PARAM;
205    BEGIN
206    END;
207   PROCEDURE UNTYPED PROCEDURE (REAL_PARAM, INTEGER_ARRAY_PARAM);
208    REFERENCE REAL_PARAM;
209    REAL REAL_PARAM;
210    INTEGER ARRAY INTEGER_ARRAY_PARAM [0];
211    BEGIN
212    END;
213   EXPORT UNTYPED_PROCEDURE, TYPED_PROCEDURE;
214   FREEZE (PERMANENT);
215  END.
```

*Figure 2*

```
900  /* global.h   */
901  typedef unsigned __int 64* PSERIESMEM_;
     #define auguments_PSERIESMEN_ memory_PSERIESMEM_params_
902  #define ASDMASK_           0xfffff
903  #define DATA_MASK_         0xffffffffff
904  #define SIGN_MASK_         0x4000000000000000
905  #define MANTISSA_MASK_     0x7fffffff
906  #define BOOL_MASK_         0x1
907  #define SIRW (w)           ((((w) >> 56) & 0xF8) == 0x10)
908  #define RETURN(r) return ((unsigned __int64)(r.value()) | (unsigned __int64)1 << 63)
909  inline unsigned long SegmentLength(PSERIESMEM_ memory, unsigned __int64* pref)
910  {
911      return (unsigned long) ((*(memory + (((*pref) & ASDMASK_) * 4) + 1)) & 0xffffff);
912  }
913  inline PSERIESMEM_ SegmentAddress(PSERIESMEM_ memory, unsigned __int64* pref)
914  {
915      return memory + (((*pref) & ASDMASK_) * 4))) & 0xffffffff;
916  }
917  inline unsigned long SegmentOffset(unsigned __int64* pref)
918  {
919      return (unsigned long) (((((*pref) >> 28) & 0xffffff) * 6) + (((*pref) >> 24) & 0xf);
920  }
921  inline PSERIESMEM_ EvalIDD(PSERIESMEM_ memory, unsigned __int64* pref)
922  {
923      return SegmentAddress(memory, pref) + (((*pref) >> 28) & 0xffffff);
924  }
925  inline PSERIESMEM_ EvalSIRW(PSERIESMEM_ memory, unsigned __int64* pref)
926  {
927      unsigned __int64 r = *pref;
928      return memory + ((*(memory + (((r >> 32) & ASDMASK_) * 4))) & 0xffffffff
929          + ((r & 0xffff0000) >> 16) + (r & 0xffff);
930  }
```

*Figure 9A*

```
931  inline PSERIESMEM_ Eval (PSERIESMEM_ memory, unsigned __int64* pref)
932  {
933  if (SIRW(*pref)) return EvalSIRW(memory, pref); else return EvalDD(memory, pref);
934  }

935  inline __int64 Int_A_to_C(unsigned __int64 r)
936  {
937     if (r & SIGN_MASK_)
938        return -((__int64) (r & MANTISSA_MASK_));
939     return (__int64) (r & MANTISSA_MASK_);
940  }

941  inline unsigned __int64 Int_C_to_A(__int64 r)
942  {
943     unsigned __int64 t;
944     if (r < 0)
945     {
946        r = -r;
947        t = ((unsigned __int64)r & MANTISSA_MASK_) | SIGN_MASK_;
948     }
949     else
950        t = (unsigned __int64)r & MANTISSA_MASK_;
951     return t;
952  }

953  class Real
954  {
955  public:
956     Real (unsigned __int64 v = 0) {v = v;}
957     Real& operator=(unsigned int64 rhs) {_v = rhs ; return *this;}
958     unsigned __int64 value() {return _v;}
959  private:
960     unsigned __int64   _v:48;
961  };
```

*Figure 9B*

```
962  class Integer
963  {
964  public:
965      Integer(__int64 v = 0){_v = v; }
966      Integer& operator=(__int64 rhs){_v = Int_C_to_A(rhs); return *this;}
967      unsigned __int64 value(){return Int_A_to_C(_v);}
968  private:
969      unsigned __int64    _v:48;
970  };
971  class Boolean
972  {
973  public:
974      Boolean(unsigned __int64 v = 0) {_v =v; }
975      Boolean& operator+ (bool rhs){_v = rhs; return *this;}
976      unsigned __int64 value(){return (bool)_v;}
977  private:
978      unsigned __int64    _v:l;
979  };
980  class IntegerArray
981  {
982  public:
983      IntegerArray(PSERIESMEM_ memory, unsigned __int64* pref)
984      {
985          _pv = (integer*)SegmentAddress(memory, pref);
986          _el = SegmentLength(memory, pref);
987      }
988  Integer& operator[] (unsigned long sub)
989      {
990          Integer err = 0;
991          If(sub < el) return _pv[sub]; else return err;
992      }
993      unsigned long element(){return _el;}
994  private:
995      IntegerArray& operator= (Integer rhs);
996      Integer* _pv;
997      unsigned long _el;
998  };
```

*Figure 9C*

```
1000  /*   prototypes.h   */
1001  #include "global.h"
1002  bool Load_(void);
1003  void UnLoad_(void);
1004  Boolean TYPED_PROCEDURE(Boolean, Integer);
1005  void UNTYPED_PROCEDURE(Real&,IntegerArray&);
```

*Figure 10*

```
1100  /*   win32dll.cpp    */
1101  #include "prototypes.h"
1102  unsigned long TypeArray[] =
1103  {
1104      10,0,5637,4,4,8193,515,8194,2,8193,6151,4,6,1,6,4097,2,4097,0,1
1105  };
1106  __declspec(dllexport)  bool LOAD$()
1107  {
1108      return Load_();
1109  }
1110  __declspec(dllexport)  void UNLOAD$(void)
1111  {
1112      UnLoad_();
1113  }
1114  __declspec(dllexport) void* TYPED_PROCEDURE$(unsigned __int64* types_)
1115  {
1116      unsigned __int64* typestart = ((unsigned __int64*)TypeArray) + 5;
1117      int numtypes = 3;
1118      while (numtypes>=0){if (types_[numtypes] != typestart[numtypes]) return NULL; numtypes--;}
1119      return TYPED_PROCEDURE$_;
1120  }
1121  unsigned __int64 __stdcall TYPED_PROCEDURE$_(auguments_)
1122  {
1123      Boolean rslt_;
1124      Boolean* arg0 = (Boolean*)params_;params_++;
1125      Integer* arg1 = (Integer*)params_;params_++;
1126      rslt_ = TYPED_PROCEDURE(*arg0 ,*arg1);
1127      RETURN(rslt_);
1128  }
```

*Figure 11A*

```
1129  __declspec(dllexport) void* UNTYPED_PROCEDURE$(unsigned __int64* types_)
1130  {
1131      unsigned __int64* typestart = ((unsigned __int64*)TypeArray) + 1;
1132      int numtypes = 3;
1133      while (numtypes>=0){if (types_[numtypes] != typestart[numtypes]) return NULL; numtypes--;}
1134      return UNTYPES_PROCEDURE$_;
1135  }

1136  unsigned __int64 __stdcall UNTYPED_PROCEDURE$_(auguments_)
1137  {
1138      Real* arg0 = (Real*)Eval(memory_,params_);params_++;
1139      IntegerArray arg1(memory_,params_); params_++;
1140      UNTYPED_PROCEDURE(*arg0,arg1);
1141      return 0;
1142  }
```

*Figure 11B*

METHOD, APPARATUS, AND COMPUTER PROGRAM PRODUCT FOR REPLACING A DYNAMIC LINK LIBRARY (DLL) OF A FIRST COMPUTING ENVIRONMENT WITH A DLL OF A SECOND COMPUTING ENVIRONMENT THAT CAN BE INVOKED FROM THE FIRST COMPUTING ENVIRONMENT IN A TRANSPARENT MANNER

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to computer systems, and more particularly, to a method, apparatus, and computer program product for replacing a dynamic link library (DLL) of a first computing environment with a DLL of a second computing environment that can be invoked by a calling application in the first computing environment in a manner that is transparent to the calling application. The present invention is particularly useful in systems in which the first computing environment is emulated within the second computing environment.

2. Description of the Prior Art

Most computer operating systems provide a dynamic link library facility that enables a computer programmer to provide certain executable procedures and functions in the form of a library that is separate from the applications that execute on the computer. Typically, an application is dynamically linked to the library at run-time, so that the application can call one or more of the procedures and functions that are exported by the library. Exported procedures are referred to as entry points into the library. Unlike regular applications, which are generally executed from the beginning, a library can be entered at any entry point. Libraries allow a computer programmer to keep certain types of procedures and functions that are commonly used by numerous applications in a single library code file that all applications can use. This eliminates the need to duplicate code for common functions in each application.

FIG. 1 shows an exemplary computer system. 10, such as a Unisys A Series or ClearPath HMP NX computer system, that runs the Unisys MCP operating system 12. The computer system 10 is referred to herein as an MCP server. The MCP operating system provides a dynamic link library facility of the type described above. This facility allows an application program 14 to call one or more exported procedures 18a, 18b, 18c from a library code file 16. Each exported procedure has a procedure name (e.g., "P1", "P2", "P3", etc.) and may receive one or more arguments or parameters (e.g., "arg0", "arg1", "arg2", etc.). Each argument has a predefined data type. The name of a procedure, its arguments, and their data types represent an interface, sometimes also commonly referred to as a signature, for the procedure. Any call made to a given library procedure from an application must adhere to the procedure's interface. That is, the correct name of the procedure must be used in the calling application, and the number and data types of the arguments passed to the procedure by the calling application must match those of the procedure's interface. For purposes of illustration herein, the interfaces of each of the exported procedures 18a, 18b, and 18c of the library code file 16 are represented respectively at 20a, 20b, and 20c.

Referring still to FIG. 1, when the source code for a library is compiled in the MCP operating system environment, the compiler generates a directory 22 that becomes part of the executable library object code file 16. The directory 22 contains a description of each of the exported procedures in the library, including the name and type of the procedure and a description of its arguments.

When the source code of an application program that calls one or more procedures of a library is compiled in the MCP operating system environment, the compiler generates a template 24 that becomes part of the compiled application program object code file 14. The template 24, like the directory 22, contains information about the library 16 and any declared procedures that it will call in the library. Specifically, the template 24 contains a description of the attributes of the library 16 and a description of each procedure in the library that the application program has imported. For each imported procedure, the template specifies the name and data type of the procedure and a description of each of its arguments.

FIG. 2 is a source code listing of an exemplary dynamic link library for the MCP operating system environment. This exemplary library exports two procedures, one of which is a typed procedure (TYPED_PROCEDURE (BOOLEAN_PARAM, INTEGER_PARAM)) (lines 201–206) and the other of which is an un-typed procedure (UNTYPED_PROCEDURE (REAL_PARAM, INTEGER_ARRAY_PARAM)) (lines 207–212). The typed procedure has two argument (sometimes also called parameters), one having a BOOLEAN data type and the other having an INTEGER data type. The untyped procedure also has two arguments, one having a REAL data type and the other having an INTEGER ARRAY data type.

FIG. 3 is a graphical depiction of the contents of the directory 22' that is created when the source code listing of FIG. 2 is compiled in an MCP operating system environment. As shown, the directory is a single block of data having several sub components, including a Header block 25, an Exports block 26, a Types block 28, and a Names block 30. The Header block 25 appears physically at the beginning of the directory 22' and contains, in fixed locations, pointers to the other sub components. The Names block 30 contains the names (character strings) of the various exported items. The Types block 28 contains encoded descriptions of the types of the exported procedures and their parameters. Finally, the Exports block 26 contains an entry for each exported item. Each entry in the Exports block 26 contains a pointer to the name (within the Names block 30), and the type signature (within the Types block 28) of the exported item. The type signatures are in the form of a recursive description, with the kind of item (procedure, function, etc.) at the top. This is followed by the return value type, if any, and then the parameters in order. If the parameters have additional structure (such as an array), that information is included within the description for the parameter. Each element of a type description carries a length indication which includes any subordinate information. As mentioned above, the name of an exported procedure and the specification of the data types of its parameters define an interface, or signature, for the exported procedure.

FIG. 4 is a graphical depiction of the contents of the template 24' that is created when the source code of an application program that imports both of the exported procedures of the library of FIG. 2 is compiled in the MCP operating system environment. As shown, the template 24' includes a Header block 34, an Imports block 36, a Types block 38, a Names block 40, and an Attributes block 42. The Header block 34 appears physically at the beginning of the template 24' and contains, in fixed locations, pointers to the other sub components. The Names block 40 contains the names (character strings) of the items that the application program has declared as imports. The Types block 38 contains encoded descriptions of the types of the imported procedures and their parameters. The imports block 36 contains an entry for each imported item. Each entry in the imports block 36 contains a pointer to the name (within the Names block 40), and the type signature (within the Types block 38) of the imported item. As in the directory 22', the type signatures are in the form of a recursive description, with the kind of item (procedure, function, etc.) at the top. This is followed by the return value type, if any, and then the parameters in order. If the parameters have additional structure (such as an array), that information is included within the description for the parameter. Each element of a type description carries a length indication which includes any subordinate information. Finally, the Attributes block 42 contains information about the attributes of the requested library. One series of attributes, for example, specifies the file name of the library code file to which the application will dynamically link.

In the MCP operating system environment, on the first call of an imported procedure of the library by a calling application or at an explicit linkage request, the calling application is suspended. The description of the imported procedure in the library template of the calling application is then compared to the description of the exported procedure in the directory of the library code file to ensure that the parameters match. If not, a run-time error is generated and the calling program is terminated. If the parameters match, then the library code file executes up to the FREEZE statement (see FIG. 2, line 214). All of the exported procedures that are declared in the calling application are then dynamically linked to the calling application, and the calling application resumes execution. Because the linking is performed dynamically at run-time, the library is generally referred to as a dynamic link library (DLL). Other operating systems support a similar notion of dynamic link libraries. For example, the Microsoft Windows NT operating system environment supports the use of Win32DLL s which function in an analogous manner. However, the parameter matching that is performed in the MCP environment is not performed by the Windows NT environment, leading to the possibility of inadvertent errors during program execution.

Today, it is becoming increasingly common to emulate one computing environment within a second computing environment. Because of the incompatibilities between the emulated and native computing environments, it normally is not possible for an application program executing in the emulated computing environment to invoke the exported procedures of a dynamic link library executing in the native computing environment. In many situations, however, it may be desirable to replace the functionality provided in one or more dynamic link libraries of the emulated computing environment, which otherwise would have to be executed by emulation, with a dynamic link library in the native computing environment that provides equivalent functionality in that native machine environment. For example, in many computing environments, networking functionality is implemented in the form of a dynamic link library to which applications link to obtain networking services. When such a computing environment is emulated within another computing environment that employs its own, native dynamic link library to handle networking functionality, it would be desirable for an application program executing in the emulated environment to link to the native dynamic link library, rather than executing its own library code via emulation. This would result in much faster execution of network operations by an emulated application. It would also be desirable if such a capability could be achieved in a manner that is transparent to the calling application of the first computing environment, i.e., in a manner that does not require any changes or re-compilation of the calling application. The present invention provides such capabilities.

SUMMARY OF THE INVENTION

The present invention is directed to a method, apparatus, and computer program product for replacing a dynamic link library (DLL) of a first computing environment with a DLL of a second computing environment that can be invoked by a calling application in the first computing environment in a manner that is transparent to the calling application. More specifically, in accordance with the present invention, a first DLL of a first computing environment, which exports one or more procedures that an application program executing in the first computing environment can call, is replaced with a second DLL that executes in a second computing environment. The second DLL is generated based on information contained in a directory of the compiled object code of the first DLL. The exported procedures of the second DLL have interfaces that are identical (from the perspective of the calling application) to the interfaces of the corresponding exported procedures of the first DLL, but the exported procedures of the second DLL comprise native code of the second computing environment. The calling application executing in the first computing environment is then linked dynamically to the exported procedures of the second DLL in the second computing environment in a manner that is transparent to the calling application. The second DLL thus effectively replaces the first DLL. The present invention is particularly useful in systems in which the first computing environment is emulated within the second computing environment.

In a preferred embodiment, the second DLL is generated as follows. Information contained in the directory of the compiled object code file of the first DLL is extracted in order to identify its exported procedures and their respective interfaces. A source code skeleton of the second DLL is then generated from the information extracted from the directory of the compiled object code file of the first DLL. In accordance with the present invention, the source code skeleton of the second DLL comprises, for each exported procedure to be reproduced in the second DLL, (i) a parameter matching routine that, when invoked, verifies whether a calling application in the first computing environment was compiled with an interface description for the exported procedure that matches the corresponding interface description for that exported procedure in the second DLL; (ii) an interface jacket routine that maps arguments of the exported procedure supplied by a calling application in the first computing environment into corresponding arguments that can be manipulated properly by the code of the second DLL in the second computing environment; and (iii) a prototype declaration for the exported procedure. Native code of the second computing environment is then added to the source code skeleton of the second DLL to establish the functionality of each exported procedure of the second DLL within the second computing environment. The second DLL thus reproduces the exported interface of each exported procedure of the first DLL, but contains native code of the second computing environment in the body of each procedure. The completed source code of the second DLL is then compiled in the second computing environment. Further in accordance with the preferred embodiment of the present invention, linking of the second DLL to a calling application in the first computing environment is performed as follows. The compiled second DLL is located and loaded in the second computing environment. Next, the procedures of the DLL that are imported by the calling application are identified. For each exported procedure imported by the calling application, the corresponding parameter matching routine exported by the second DLL is invoked. If the parameter matching routine executes successfully, then the parameter matching routine will return an entry point for the corresponding interface jacket routine for this exported procedure. The current entry point for this exported procedure in the calling application is then replaced with the entry point for the interface jacket routine in the second DLL. When the calling application subsequently calls one of the exported procedures, the interface jacket routine for that procedure in the second DLL will execute. The interface jacket routine will encapsulate, or map, the parameters supplied by the calling application into equivalent parameters that can be manipulated by the native code of the second DLL. The code comprising the body of the exported procedure then executes.

The method of the present invention may be implemented in the form of a code generator that performs the source code generation for the second DLL and a linker that links the second DLL to a calling application in the first computing environment in a manner that is transparent to the calling application. The present invention may also be embodied in the form of program code that, when executed on a computer system, performs the method of the present invention.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 2 is a source code listing of an exemplary dynamic link library for use in the computer system of FIG. 1;

FIGS. 9A–9C, 10, and 11A–B comprise a source code listing of an exemplary dynamic link library generated in accordance with the method of the present invention;

DETAILED DESCRIPTION OF THE PREFERRED EMBODIMENT

I. Overview

The present invention is directed to a method, apparatus, and computer program product for replacing a dynamic link library (DLL) of a first computing environment with a DLL of a second computing environment that can be invoked by a calling application in the first computing environment in a manner that is transparent to the calling application. More specifically, in accordance with the present invention, a first DLL of a first computing environment, which exports one or more procedures that an application program executing in the first computing environment can call, is replaced with a second DLL that executes in a second computing environment. The second DLL is generated based on information contained in a directory of the compiled object code of the first DLL. The exported procedures of the second DLL have interfaces that are identical (from the perspective of the calling application) to the interfaces of the corresponding exported procedures of the first DLL, but the exported procedures of the second DLL comprise native code of the second computing environment. The calling application executing in the first computing environment is then linked dynamically to the exported procedures of the second DLL in the second computing environment in a manner that is transparent to the calling application. The second DLL thus effectively replaces the first DLL. The present invention is particularly useful in systems in which the first computing environment is emulated within the second computing environment. As used herein and in the claims, the term "computing environment" means an operating system environment in which an application program can execute. A computing environment may include the hardware of an underlying, native computer system, or the computing environment may be emulated within another computing environment running on a native system. As used herein and in the claims, the term "transparent manner" and the like, means in a manner that does not require any modification or re-compilation of the calling program in the first computing environment.

Figure 5:
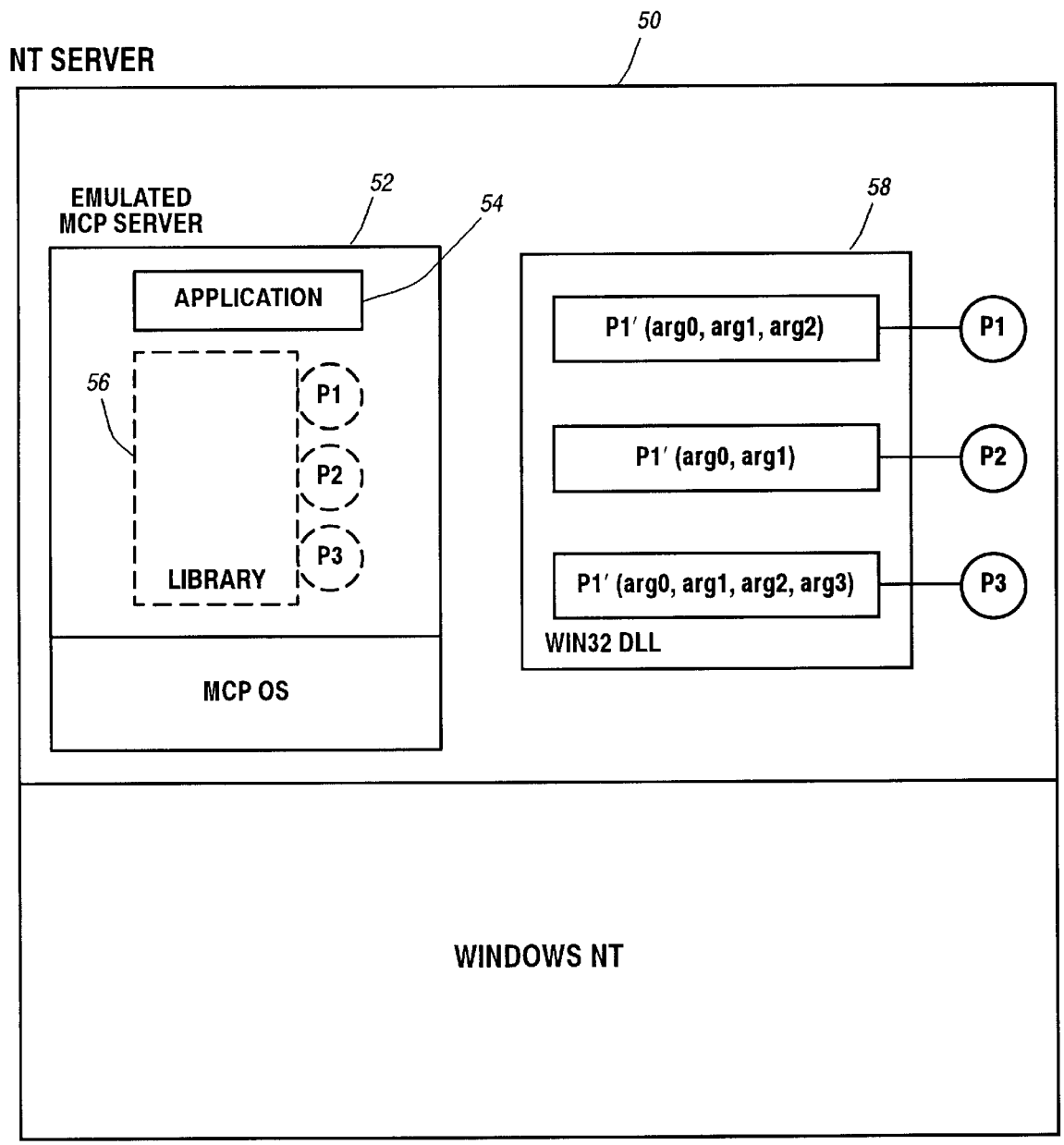
FIG. 5 illustrates one exemplary use of the present invention.

FIG. 5 illustrates an exemplary use of the present invention in a system in which a first computing environment is emulated within a second computing environment. Specifically, in this example, an MCP server environment 52 is emulated within a computer system 50 running under the Windows NT operating system (i.e., an NT server). Co-pending application ser. No. 09/294,617, filed Apr. 19, 1999, entitled "System, Computer Program Product, and Methods for Emulation of Computer Programs", which is hereby incorporated by reference in its entirety, describes software that can be used to emulate a Unisys MCP server environment on a native server running Windows NT. An application 54 executing in the emulated MCP server environment 52 can call exported procedures from an MCP-based library code file 56 also running in the emulated environment. However, the present invention may be employed to replace the library code file 56 in the emulated MCP environment with another dynamic link library 58 that executes in the native environment of the NT server 50. For example, in a typical MCP server, networking functionality is implemented in the form of a library code file to which applications link to obtain networking services. Rather than executing that library code via emulation in the exemplary system of FIG. 5, the present invention can be used to replace the MCP-based library code file with a Win32DLL in the NT server environment 50 that can make use of the native networking functionality provided by the Windows NT operating system. This results in much faster execution of network operations by an emulated MCP-based application, in a manner that is transparent to the emulated application.

II. DLL Code Generation

Figure 6:
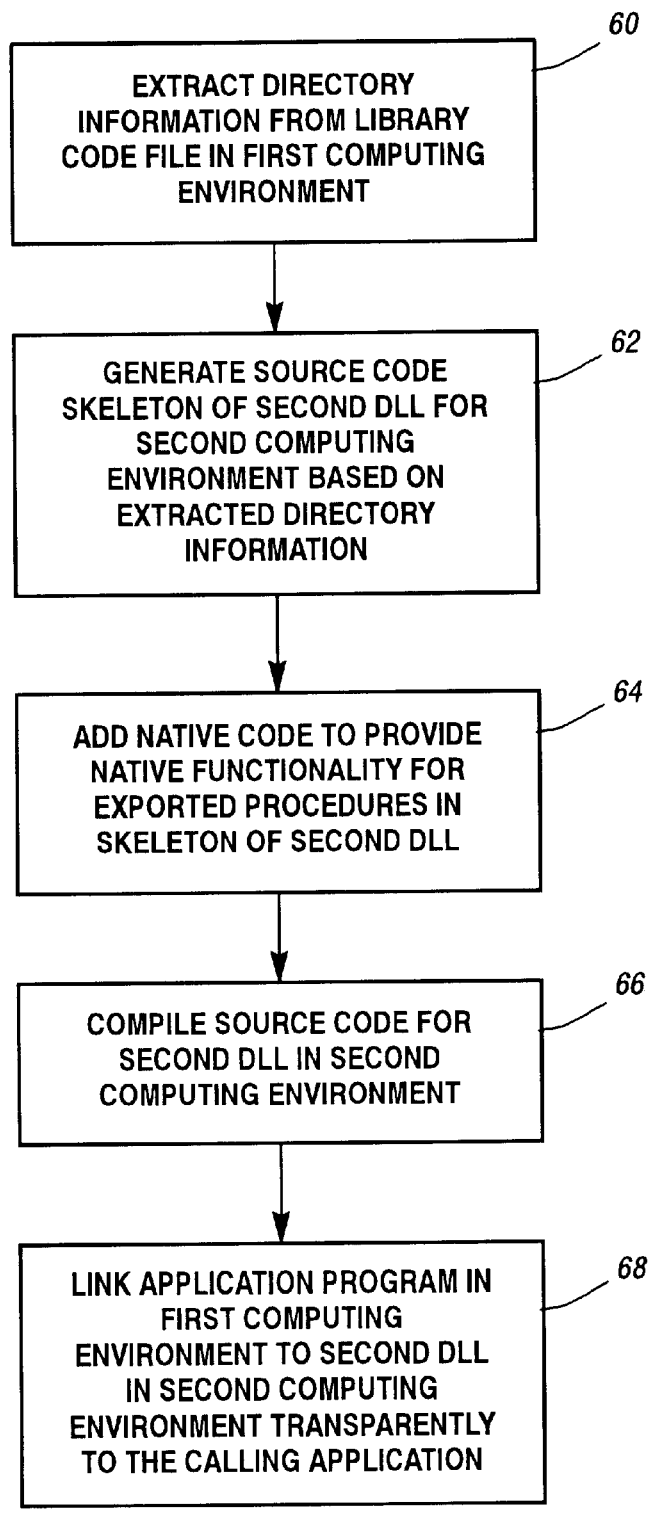
FIG. 6 is a flow diagram illustrating one embodiment of a method of the present invention.

FIG. 6 is a flow diagram illustrating one embodiment of a method for replacing a first dynamic link library (DLL) of a first computing environment with a second DLL of a second computing environment that can be invoked by a calling application in the first computing environment in a manner that is transparent to the calling application, in accordance with the present invention. With reference to the example of FIG. 5, the first computing environment may comprise the MCP server environment 52, and the second computing environment may comprise the NT server environment 50, the MCP server environment 52 being emulated within the NT server environment 50. Further with respect to this example, the first DLL may comprise the compiled, MCP-based library code file 56 that normally would execute within the MCP server environment, and the second DLL may comprise a Win32DLL 58 within the NT server environment 50.

At step 60, information contained in the directory of the compiled object code file of the first DLL is extracted in order to identify its exported procedures and their respective interfaces (i.e., procedure names and parameter data types). At step 62, a source code skeleton of the second DLL is generated from the information extracted from the directory of the compiled object code file of the first DLL. As described in greater detail hereinafter, in accordance with the present invention, the source code skeleton of the second DLL comprises, for each exported procedure to be reproduced in the second DLL, (i) a parameter matching routine that, when invoked, verifies whether a calling application in the first computing environment was compiled with an interface description for the exported procedure that matches the corresponding interface description for that exported procedure in the second DLL; (ii) an interface jacket routine that maps arguments of the exported procedure supplied by a calling application in the first computing environment into corresponding arguments that can be manipulated properly by the code of the second DLL in the second computing environment; and (iii) a prototype declaration for the exported procedure. In addition to the foregoing, the source code skeleton for the second DLL contains all the necessary native code of the second computing environment in order to enable the source code to be compiled as a dynamic link library in the second computing environment. For example, in the example of FIG. 5, the source code skeleton would contain all the necessary code to compile the file as a Win32DLL. Information concerning the code needed to compile a source code file as a dynamic link library in a given computing environment is typically provided in reference materials associated with that environment. For example, information concerning the code needed to compile a source code file as a Win32DLL in the Microsoft Windows NT environment is available from Microsoft Corporation, for example, from its Microsoft Developers Network (MSDN) Library available online at http://msdn.microsoft.com, and from numerous other publications. Information concerning the code needed to compile a source code file as a dynamic link library in the Unisys MCP environment can be found in the ALGOL Programming Reference Manual, Vol. 1, publication #8600 0098-503, available from Unisys Corporation, which is incorporated herein by reference in its entirety.

Next, at step 64, native code of the second computing environment is added to the source code skeleton of the second DLL to establish the functionality of each exported procedure of the second DLL within the second computing environment. The second DLL thus reproduces the exported interface of each exported procedure of the first DLL, but contains native code of the second computing environment in the body of each procedure. At step 66, the completed source code of the second DLL is compiled in the second computing environment.

Finally, at step 68, upon the first call by an application program in the first computing environment to one of the exported procedures that would normally reside in the first DLL, the application program is instead linked to the second DLL in the second computing environment in a manner that is transparent to the calling application. The second DLL thus effectively replaces the first DLL.

Figure 7:
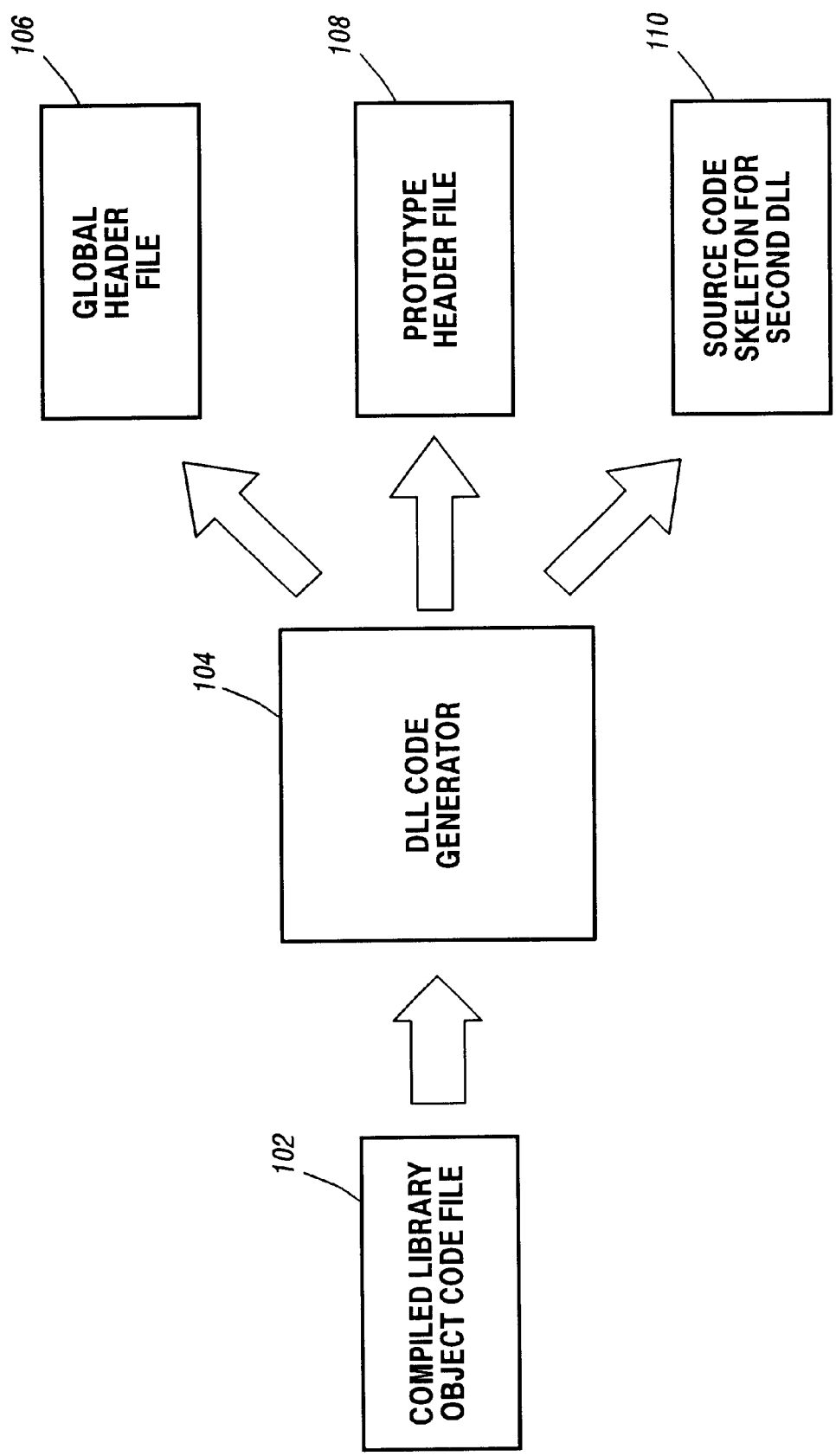
FIG. 7 is a block diagram illustrating a source code generator in accordance with an embodiment of the present invention.

The source code generation step 62 of FIG. 6 preferably is performed automatically by a code generator. FIG. 7 illustrates the inputs and outputs of a code generator 104 that operates in accordance with the present invention to perform the source code generation of step 62 of FIG. 6. As shown, in the presently preferred embodiment, the code generator 104 receives as an input the compiled object code file of the first DLL, and produces therefrom a global header file 106, a prototype header file 108 that contains prototype definitions for each of the procedures that will be exported from the second DLL, and a skeleton of a main source code file 110 for the second DLL. As mentioned above, native code must then be added to the main source code file to provide the necessary functionality for each exported procedure in the second computing environment (step 64 of FIG. 6). The two header files and the completed main source code file for the second DLL are then compiled in the second computing environment to create the second DLL (step 66 of FIG. 6).

Figure 8:
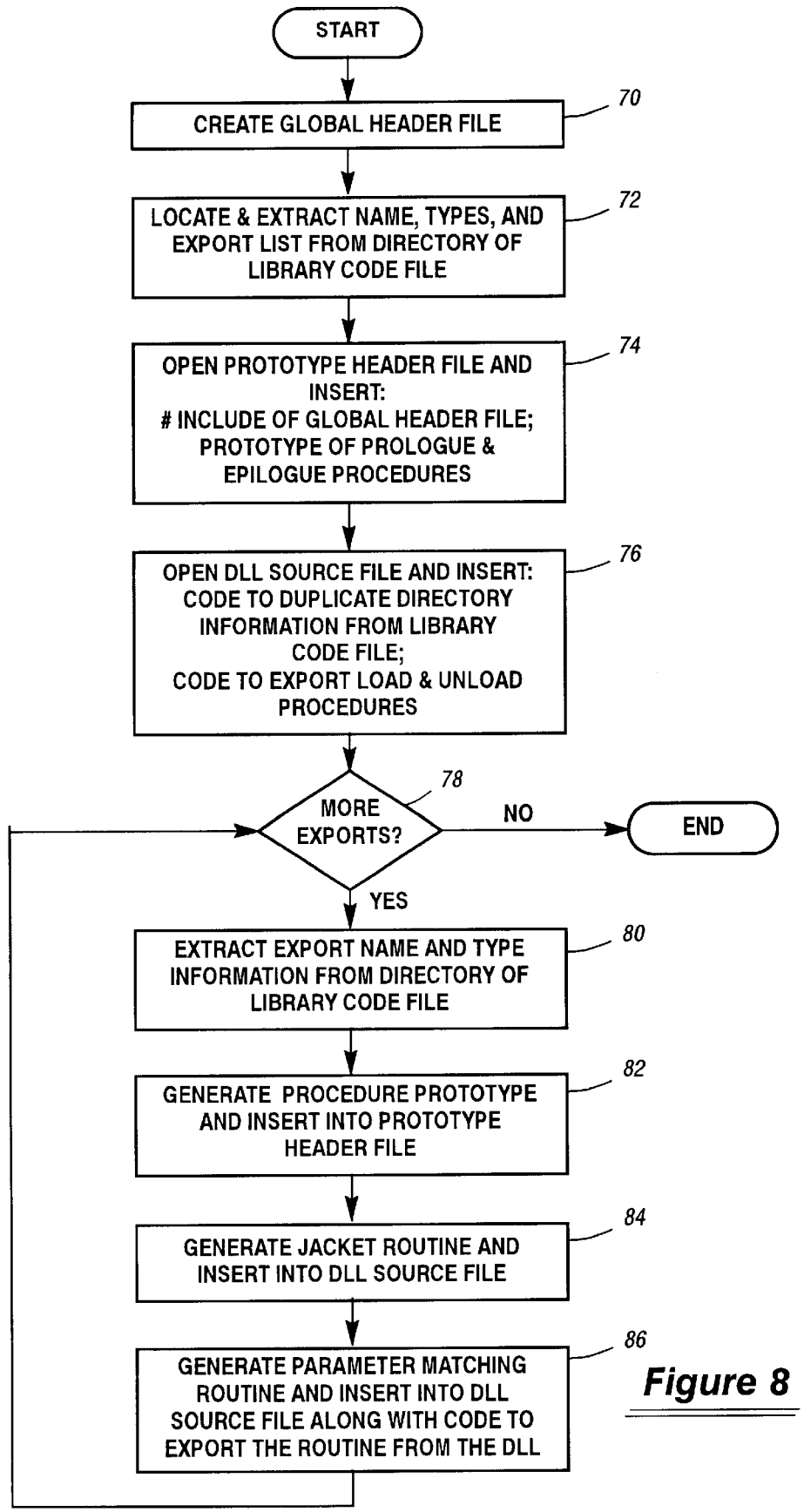
FIG. 8 is a flow diagram illustrating further details of the method of FIG. 5 and the operation of the source code generator of FIG. 7.

FIG. 8 is a flow diagram providing further details of the source code generation step 62 of FIG. 6, as well as illustrating the operation of the code generator 104 (FIG. 7) of the presently preferred embodiment. As shown, at step 70, in the present environment, the global header file 106 (FIG. 7) is generated first. This file contains global definitions, as well as a set of object-oriented class definitions for encapsulating certain data types of the first computing environment to support the function of the interface jacket routines mentioned above and described more fully below.

At step 72, information about the exported procedures of the first DLL is extracted from the directory of the compiled code file of the first DLL. Specifically, the name of each exported procedure of the first DLL is extracted, along with information identifying the number, order, and data type of each parameter (i.e., argument) that can be passed to the procedure. All of this information combines to define the exported "interface" of the procedure.

Next, at step 74, further in accordance with the present embodiment, the prototype header file 108 (FIG. 7) is created. This header file will contain prototype definitions for each of the exported procedures reproduced in the second DLL (generated as described below in step 82). In addition, a compiler directive is inserted to include the global header file 106. If the first computing environment supports the concept of prologue or epilogue procedures, prototypes for corresponding prologue and epilogue procedures in the second DLL are also inserted into this header file.

Next, at step 76, the file 110 that will serve as the main source code skeleton for the second DLL is opened. A compiler directive is inserted to include the prototype header file 108 created in step 74. Also, source code is inserted that reproduces the directory information extracted from the code file of the first DLL, to provide access to that information, if needed, in the second DLL. Additionally, if the first DLL contained prologue or epilogue procedures, code is inserted in the second DLL to export corresponding prologue and epilogue procedures reproduced in the second DLL.

Next, steps 80 through 86 are performed for each exported procedure of the first DLL that is to be reproduced in the second DLL. At step 80, the name of the exported procedure and the data type information for each of its parameters is collected from the extracted directory information of the first DLL. At step 82, a prototype definition for the exported procedure is generated and inserted into the header file 108 created in step 74. At step 84, an interface jacket routine is generated and inserted into the main source code file 110 for the second DLL. The interface jacket routine uses the encapsulating classes defined in the global header file 106 to map arguments of the exported procedures supplied by a calling application in the first computing environment into corresponding arguments that can be manipulated properly by the code of the second DLL in the second computing environment. Finally, at step 86, a parameter matching routine is created and inserted into the main source code file for the second DLL. When invoked, the parameter matching routine verifies whether a calling application in the first computing environment has been compiled with an interface description for the exported procedure that matches the corresponding interface description for that exported procedure in the second DLL. Once these steps are repeated for each exported procedure, the source code skeleton for the second DLL is complete. At this point, additional native code of the second computing environment must then be inserted to build the body of each exported procedure in the second DLL, thus defining its functionality in the second computing environment (step 64 of FIG. 6).

FIGS. 9A–9C, 10, and 11A–11B are source code listings of an exemplary global header file, prototype header file, and Win32DLL source code skeleton file, respectively, generated by code generator 104 in accordance with the method of the present invention using a compiled version of the MCP-based dynamic link library listed in FIG. 2. In the presently preferred embodiment, the code generator 104 produces source code in the C++ programming language. However, in other embodiments, the code generator 104 could produce source code in any other programming language that supports dynamic link libraries.

Referring to FIGS. 9A–9C, the global header file (globals.h) contains global definitions and the C++ classes required to perform the parameter mapping functionality of the interface jacket routines. More specifically, lines 900–901 are definitions that provide a pointer to any arguments that a calling application has placed on its stack (referred to in the MCP environment as the calling application's activation record). Lines 902–907 are additional definitions for a variety of data and control work masks. These masks are used inside the C++ classes discussed below to facilitate extraction of data from the parameters (i.e., arguments) passed to a given exported procedure. For the case illustrated in FIG. 5, in which the MCP server environment is executed by emulation in the NT server environment, line 908 is a definition that provides a mechanism for control to return to the emulator following the execution of a given exported procedure of the second DLL.

Lines 909–924 comprise a set of inline functions that provide array bounding code to support passing parameters of data type INTEGER ARRAY to the exported procedure UNTYPED_PROCEDURE (see FIG. 2). Lines 925–934 comprise two inline functions that support passing arguments by reference. These functions are used in the present example to pass parameters of data type REAL_PARAM by REFERENCE to the exported procedure UNTYPED_PROCEDURE. Lines 935–952 comprise two inline functions that perform externally signed octal-to-twos complement conversion on parameters of data type INTEGER (and vice versa). Finally, lines 953–998 comprise the class definitions of the classes that will be used in the interface jacket routines, described in greater detail below, to map parameters supplied by a calling application in the first computing environment into corresponding parameters that can be manipulated properly by the code of the second DLL in the second computing environment. The main purpose of these encapsulating classes is to convert the parameters used by the calling program in the first computing environment (e.g., the MCP server environment) into a form that can be manipulated by the native code of the second DLL in the second computing environment (e.g., the NT server environment). Additionally, the encapsulating classes place restrictions on how the parameters can be manipulated in the second computing environment so that they can only be manipulated in ways permitted for those data types in the first computing environment.

In the examples shown at lines 953–998 of FIGS. 9B and 9C, there is a Real class (lines 953–961) to provide a conversion for parameters in the MCP server environment having a REAL data type. Lines 962–970, provide a conversion for INTEGER data types of the MCP environment, and lines 971–979 provide a conversion for BOOLEAN data types. Lines 980–998 comprise an IntegerArray class that provides a conversion for the INTEGER_ARRAY data type of the MCP server environment.

FIG. 10 shows the prototype header file generated by the code generator 104 from the compiled object code file for the dynamic link library illustrated in FIG. 2. As shown, in accordance with the method of the present invention, the prototype header file contains a compiler directive to include the global header file (line 1001), followed by prototypes for a prologue procedure (line 1002), called Load(), and an epilogue procedure (line 1003), called UnLoad() (see step 74 of FIG. 8). Additionally, the prototype header file contains a procedure prototype for each of the exported functions that will be reproduced in the second DLL. These prototypes are generated in step 82 of FIG. 8. Thus, line 1004 contains a prototype for TYPED_PROCEDURE (), and line 1005 contains a prototype for UNTYPED_PROCEDURE(). Again, in the presently preferred embodiment, the prototype header file is written using the C++ programming language.

FIGS. 11A and 11B show the main source code skeleton of the second DLL, generated by the code generator 104 from the compiled object code file for the dynamic link library illustrated in FIG. 2. Again, in the presently preferred embodiment, the code generator 104 generates code of the C++ programming language. In this particular example, the generated DLL will be a Win32DLL capable of execution in the Microsoft Windows NT server environment.

Line 1101 is a compiler directive to include the prototype header file (prototype.h) of FIG. 10. Lines 1102–1105 contain, in an array data structure, a copy of the information contained in the directory of the compiled library code file input to the code generator. A copy of this information is provided in the source code skeleton of the second DLL for use by the parameter matching routines, as described more fully below. Lines 1106–1113 comprise code to export from the second DLL recreations of the epilogue and prologue procedures, if any, that were contained in the original compiled library code file. If such procedures are to be reproduced in this second DLL, the programmer must provide the native code for each procedure, the prototypes for which were generated in the prototype header file (see FIG. 10, lines 1002 and 1003).

Lines 1114–1120 and 1121–1128 list the source code for the parameter matching routine and interface jacket routine, respectively, generated by the code generator 104 for the exported procedure named TYPED_PROCEDURE() in the listing of FIG. 2.

The parameter matching routine (lines 1114-1120) is invoked during the linking step of the present invention, described hereinafter. The name of the parameter matching routine is the same as the name of the exported procedure to which it corresponds, with a "$" appended to the name. Thus, the name of the parameter matching routine in lines 1114–1120 is TYPE_PROCEDURE$(). The parameter matching routine for a given exported procedure verifies that a calling application in the first computing environment was compiled with an interface description for the exported procedure that matches a corresponding interface description for that exported procedure in the second DLL. In the presently preferred embodiment, it is this parameter matching routine that is actually exported by the generated second DLL.

Referring to lines 1114–1120, in the present embodiment, the parameter matching routine accepts a single parameter—a pointer to the name and data type information for the corresponding exported procedure in the template of the calling application of the first computing environment. The parameter matching routine compares the type information in the template of the calling application with the corresponding type information for this exported procedure in the copy of the directory of the first DLL that has been placed into the generated second DLL at lines 1102–1105. If the type information matches, the parameter matching routine returns a C++ function pointer to the interface jacket routine (lines 1121–1128).

The interface jacket routine is the one that is called by the calling application in the first computing environment, using the pointer, or entry point, returned by the parameter matching routine. The interface jacket routine uses the appropriate encapsulating class definitions provided in the global header file (lines 953–998) to map arguments of the exported procedure supplied by a calling application in the first computing environment into corresponding arguments that can be manipulated properly by the second DLL in the second computing environment. In the present example, in which the first computing environment is an MCP server environment emulated within the second computing environment, the interface jacket routine (lines 1121–1128) accepts a single parameter, which is a pointer to the program stack for the calling application (referred to in MCP jargon as the "incipient activation record") that contains the parameters to be passed into the exported procedure. An MCP-based application that attempts to call the procedure named TYPED_PROCEDURE will push a BOOLEAN parameter and an INTEGER parameter onto its stack to be passed to the exported procedure, as required by the prototype definition for that exported procedure (see, e.g., FIG. 2, line 201). At line 1124 of the interface jacket routine for this exported procedure, the BOOLEAN parameter from the stack of the calling is encapsulated in the class Boolean defined in the global header file (FIG. 9C, lines 971–976), and then is stored as "arg0". Similarly, at line 1125 of the interface jacket routine, the INTEGER parameter from the stack of the calling application is encapsulated in the class Integer defined in the global header file (FIG. 9C, lines 962–970), and then is stored as "arg1". Once this encapsulation, or mapping, is complete, the interface jacket routine calls the actual code for the exported procedure (not shown) at line 1126. As explained above, the actual code for the exported procedure must be added to the source code skeleton of the second DLL by the programmer in order to define the functionality of that procedure in the second computing environment. The result is returned to the calling application in line 1127, using the RETURN mechanism defined in the global header file at line 908.

Lines 1129–1135 and 1136–1142 show the parameter matching routine and interface jacket routine generated by the code generator 104 for the other exported procedure, UNTYPED_PROCEDURE(). The operation of these routines is similar to that described above for the procedure TYPED_PROCEDURE().

While in the present embodiment, the contents of the global header file, the prototype header file, and the main source code skeleton of the second DLL are placed in these separate files, in other embodiments they could be combined in any other manner. For example, the contents of the global header file and the prototype header file could be generated in a single header file. Alternatively, the contents of the global header file and the prototype header file could be generated in the same file as the main source code skeleton of the second DLL. Other combinations are also possible.

Figure 12:
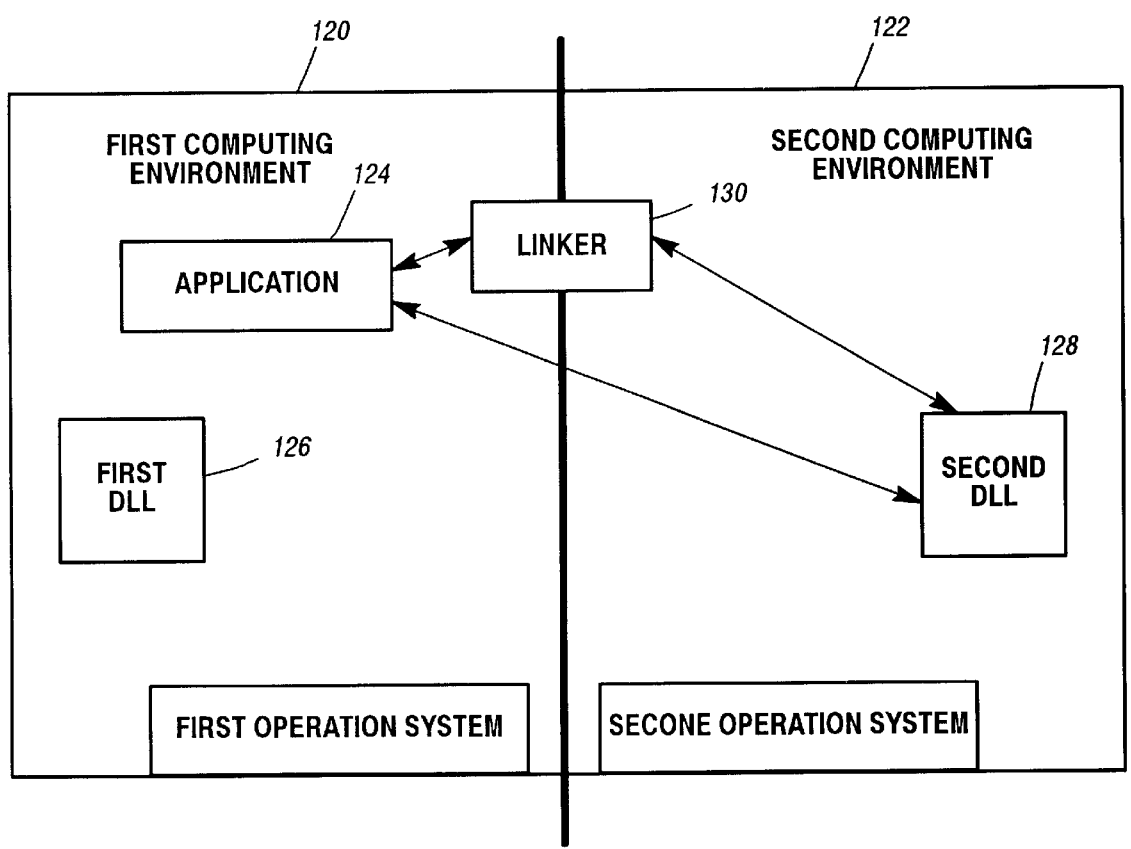
FIG. 12 is a block diagram illustrating a linker in accordance with an embodiment of the present invention.

After employing the code generator 104 (FIG. 7) of the present invention to generate a skeleton of the second DLL (step 62 of FIG. 6), and after adding native code to the skeleton to fill-in the body of each exported procedure (step 64 of FIG. 6), and after then compiling the source code for the second DLL to produce an executable object code file (step 66 of FIG. 6), the second DLL is now ready for use by a calling application. III. Linking Further details are now provided concerning the linking step (step 68 of FIG. 6) of the method of the present invention. FIG. 12 is a block diagram illustrating the use of a special-purpose linker 130 to perform this linking step in accordance with the present invention. As shown, the linker 130 is employed to handle linking of a calling application 124 in a first computing environment 120 to one or more of the exported procedures of a second DLL 128 in a second computing environment 122, which second DLL has been generated as described above from a first DLL 126 in the first computing environment. The linking is performed dynamically at run time in a manner that is transparent to the calling application 124, thereby effectively replacing the first DLL 126 with the second DLL 128. The dashed line between the calling application 124 and the second DLL 128 denotes a successful linking by the linker 130.

As can be appreciated, since one of the objects of the present invention is to provide replacement of the first DLL 126 with the second DLL 128 in a manner that is transparent to the calling application 124, i.e., in a manner that does not require any recompilation or other compile-time modification to the application source code, there needs to be some mechanism for invoking the special purpose linker 130 when the calling application 124 makes a call to one of the exported procedures that has been replaced in the second DLL 128. This can be handled in a variety of ways, depending mainly upon the operating system of the first computing environment.

In the exemplary embodiment illustrated in FIG. 5, wherein the first computing environment is an MCP server environment, a facility of the MCP operating system is used to alert the operating system that a call to a second DLL in the second computing environment is being made. This MCP facility enables certain attributes of a compiled application to be modified at run-time.

By way of additional background, the template generated by a compiler of a calling application in the MCP operating system environment contains settings for a number of attributes associated with the calling application, several of which affect the normal dynamic library linking process by designating the location of the library code file to which the application will link. In the standard MCP operating system software, three attributes, LIBACCESS, FUNCTIONNAME, and TITLE, are used for this purpose. LIBACCESS has a number of potential settings, two of which are BYTITLE and BYFUNCTION. When the setting is BYTITLE, the TITLE attribute is expected to contain the name of the library code file in the MCP file system. When the setting is BYFUNCTION, the setting of FUNCTIONNAME is used to look up a library code file in a table in the MCP of distinguished (usually privileged) library code files, which are also in the MCP file system.

In accordance with the embodiment of the present invention for use in the exemplary system of FIG. 5, two new attributes have been defined in the MCP environment, LIBTYPE and DLLPATHNAME. The potential settings for LIBTYPE include ASERIES and WIN32DLL. If the setting is ASERIES (which is also the default), the standard MCP linker for dynamic link library code files is employed and follows the conventions of the standard attributes (LIBACCESS, etc.), as described above. When the setting is WIN32DLL, the DLLPATHNAME attribute contains a full pathname in the Windows NT file system indicating the path of a Win32DLL (i.e., the pathname for the second DLL in the second computing environment).

These new attributes can be set for a calling application in the MCP environment at compile time, either explicitly through programming language constructs, or by default in the absence of such constructs. However, in order to achieve transparency of the library replacement mechanism of the present invention, a"library equation"facility of the MCP environment is employed. This facility allows attribute values established for a given application by its compiler to be overridden at run time, either through MCP work-flow language (WFL) constructs associated with the initiation (run) of the application, or corresponding programming language constructs (task attribute assignments) when the application is initiated directly from some other program. Using this facility, the LYBTYPE attribute of the calling application can be overridden when the application is run, changing the attribute from ASERIES to WIN32DLL. The MCP operating system is modified so that it invokes the special-purpose linker 130 of the present invention, instead of the standard MCP linker, whenever it detects a call to a dynamic link library whose attribute in the template of the calling application is set to WIN32DLL.

As an example, consider an MCP application program called CLIENT that invokes a MCP-based library called LIB. The library description in the source program (and thus the template in the compiled program) specifies LIBACESS=BYTITLE and TITLE="LIBRARY/PROGRAM", with LIBTYPE defaulting to ASERIES. In order to alert the MCP operating environment to invoke the special-purpose linker 130 to support replacement of that MCP-based library with a Win32DLL in accordance with the method of the present invention, the CLIENT application could be run using the following WFL statement:

RUN CLIENT; LIBRARY LIB (LIBTYPE=WIN32DLL, DLLPATHNAME="c:\libraries\lib.dll") where the Win32DLL (i.e., the second DLL) is found by the Windows NT pathname c:\libraries\lib.dll. Thus, the default LIBTYPE of ASERIES is overridden with"WIN32DLL", and the DLLPATHNAME is set to the pathname of the DLL in the NT environment that will replace the original MCP-based library code file. When the CLIENT application first attempts to make a call to an exported procedure in that Win32DLL, the MCP operating environment will invoke the special-purpose linker 130, passing the pathname of the Win32DLL to the special-purpose linker as a parameter.

For other operating system environments that do not have a similar ability to change attributes at run-time, identification of a second DLL in the second computing environment could be achieved in other ways. For example, the operating system of the first computing environment could be modified to include a look-up table mechanism that identifies each dynamic link library available in the first computing environment. For any of those libraries that are to be replaced by dynamic link libraries in a second computing environment, the table would provide the pathname of the replacement DLL in the second computing environment. Whenever an application in the first computing environment attempts to invoke an exported procedure of a library in that environment, the operating system would perform a table look-up to determine from the table whether a replacement DLL is specified for that library. If so, then the special purpose linker 130 of the present invention would be invoked with the pathname of the replacement DLL provided as a parameter. Other mechanisms for identifying when a DLL of a first computing environment is to be replaced with a DLL of a second computing environment in accordance with the present invention can be employed.

Figure 13:
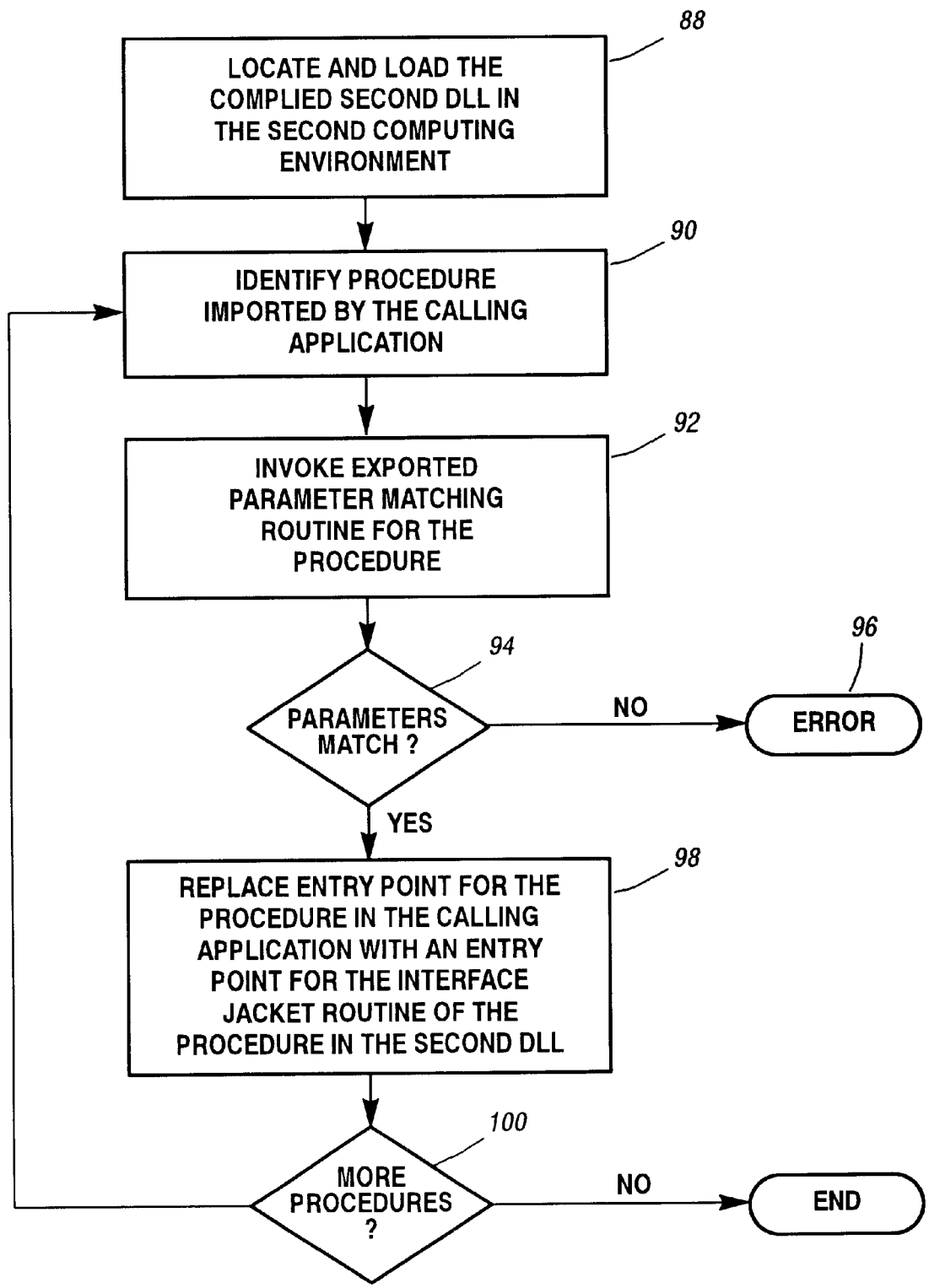
FIG. 13 is a flow diagram illustrating further details of the method of FIG. 5, as well as the operation of the linker of FIG. 12.

FIG. 13 is a flow diagram illustrating further details of the linking step of the present invention (step 68 of FIG. 6), as well as the operation of the special-purpose linker 130 of FIG. 12. When the linker 130 is invoked and passed the pathname of the replacement DLL (i.e., the second DLL) in the second computing environment, at step 88, the linker locates and loads the compiled second DLL in the second computing environment. Next, at step 90, the linker 130 identifies the procedures of the DLL that are imported by the calling application. In the exemplary embodiment described herein, wherein the first computing environment is a MCP server environment, step 90 is performed by also passing to the linker a pointer to the calling application's template. The linker then uses the information in the template of the calling application to identify which exported procedures of the DLL it has imported.

For each exported procedure imported by the calling application, the linker performs steps 92 through 98. For a given exported procedure, at step 92, the linker 130 invokes the corresponding parameter matching routine exported by the second DLL. At step 94, if the parameter matching routine executes unsuccessfully (i.e., the parameters do not match), then an error is reported to the first computing environment at step 96. If at step 94, the parameter matching routine for this procedure does execute successfully (i.e., the parameters match), then the parameter matching routine will return an entry point for the corresponding interface jacket routine for this exported procedure. At step 98, the linker then replaces the current entry point for this procedure in the calling application with the entry point for the interface jacket routine in the second DLL. As shown at step 100, this process is repeated for each other exported procedure that has been imported by the calling application.

When the calling application subsequently calls one of the exported procedures, the interface jacket routine for that procedure in the second DLL will execute. As discussed above, the interface jacket routine will encapsulate, or map, the parameters supplied by the calling application into equivalent parameters that can be manipulated by the native code of the second DLL. The code comprising the body of the exported procedure then executes, and if the exported procedure is a typed procedure, the result is returned to the calling application, as also discussed above.

Figure 1:
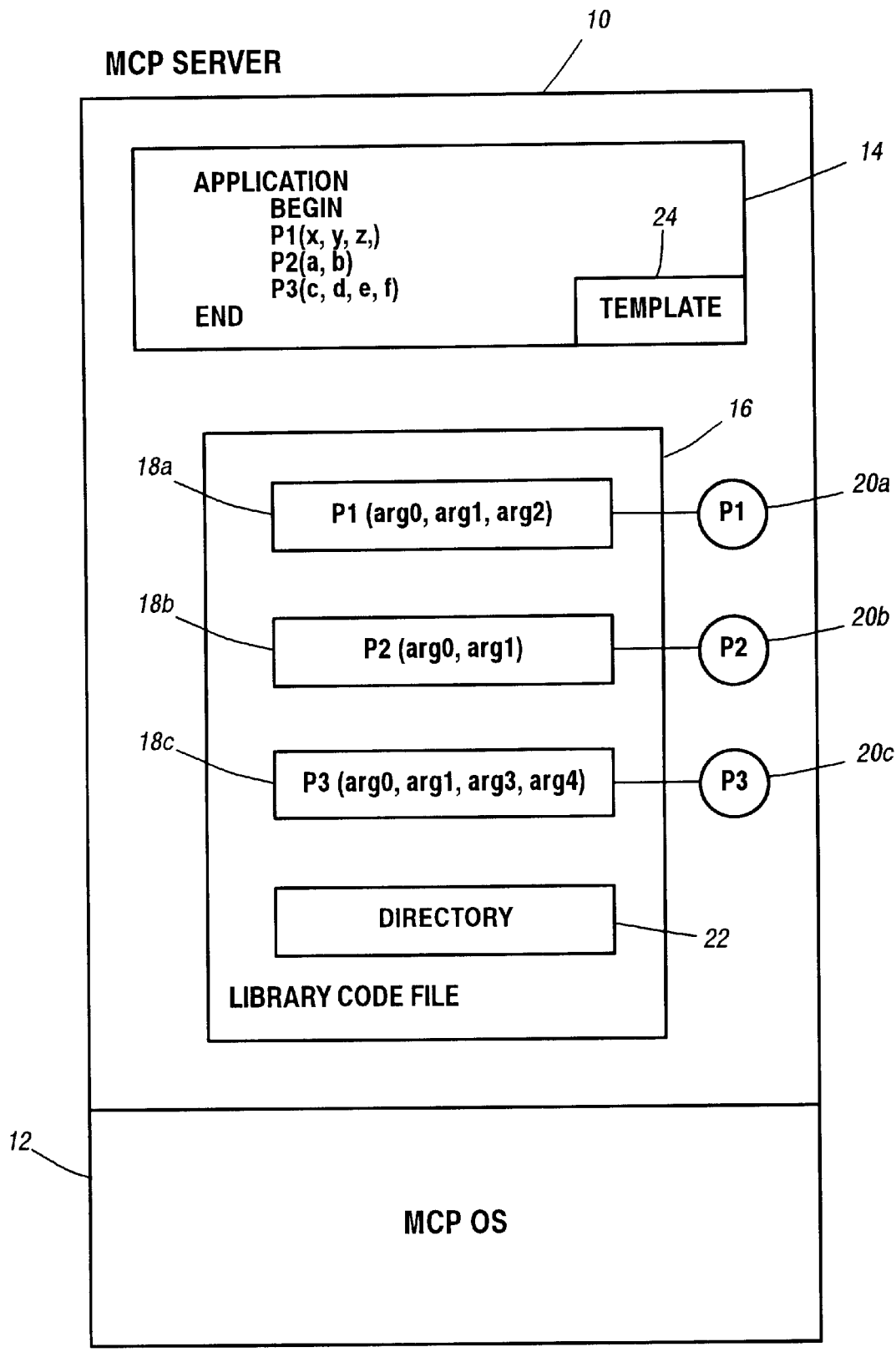
FIG. 1 is a block diagram of an exemplary computer system that supports a dynamic link library facility.
Figure 3:
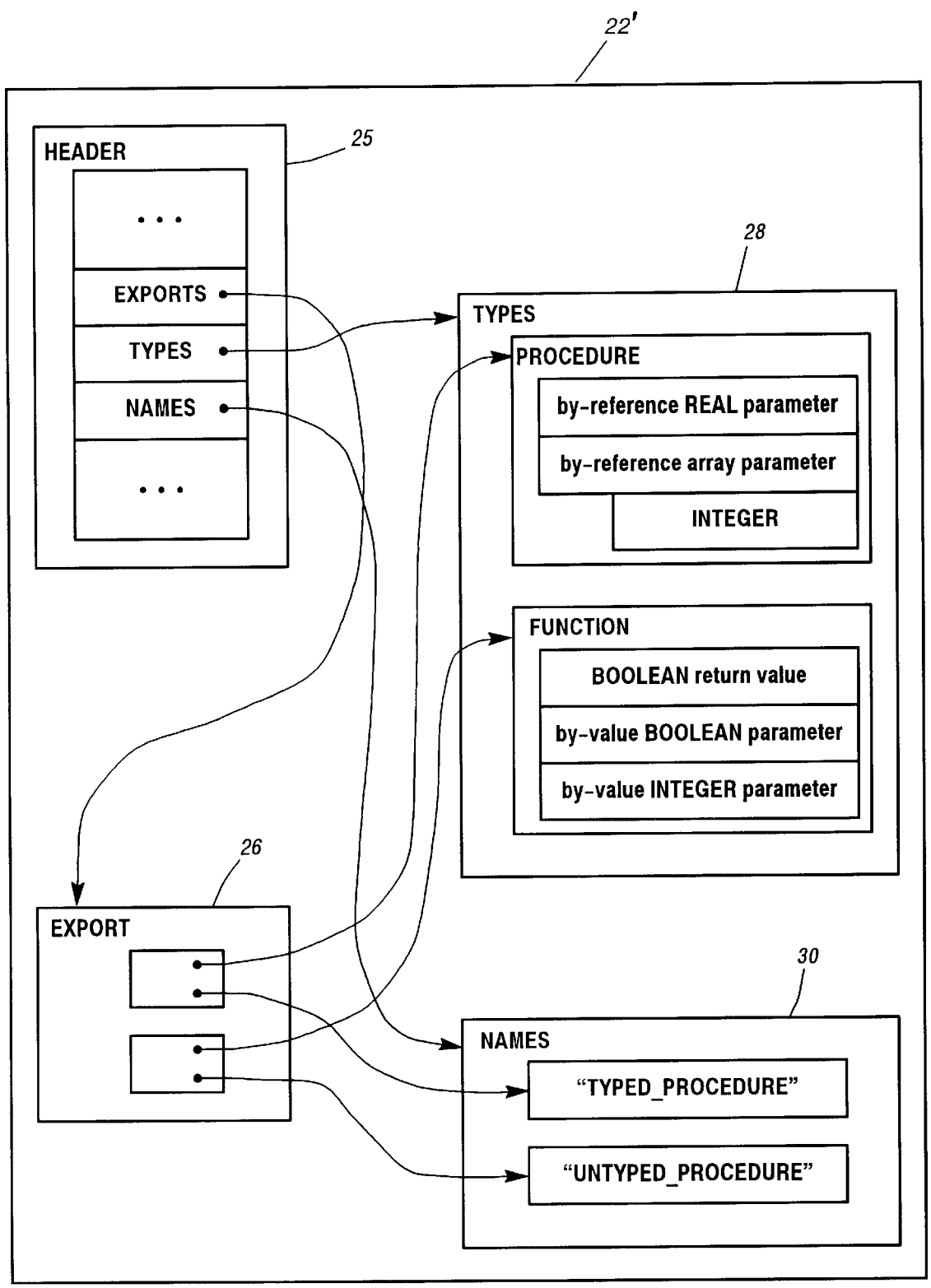
FIG. 3 is a graphical depiction of a directory that is generated during compilation of the source code listed in FIG. 2.
Figure 4:
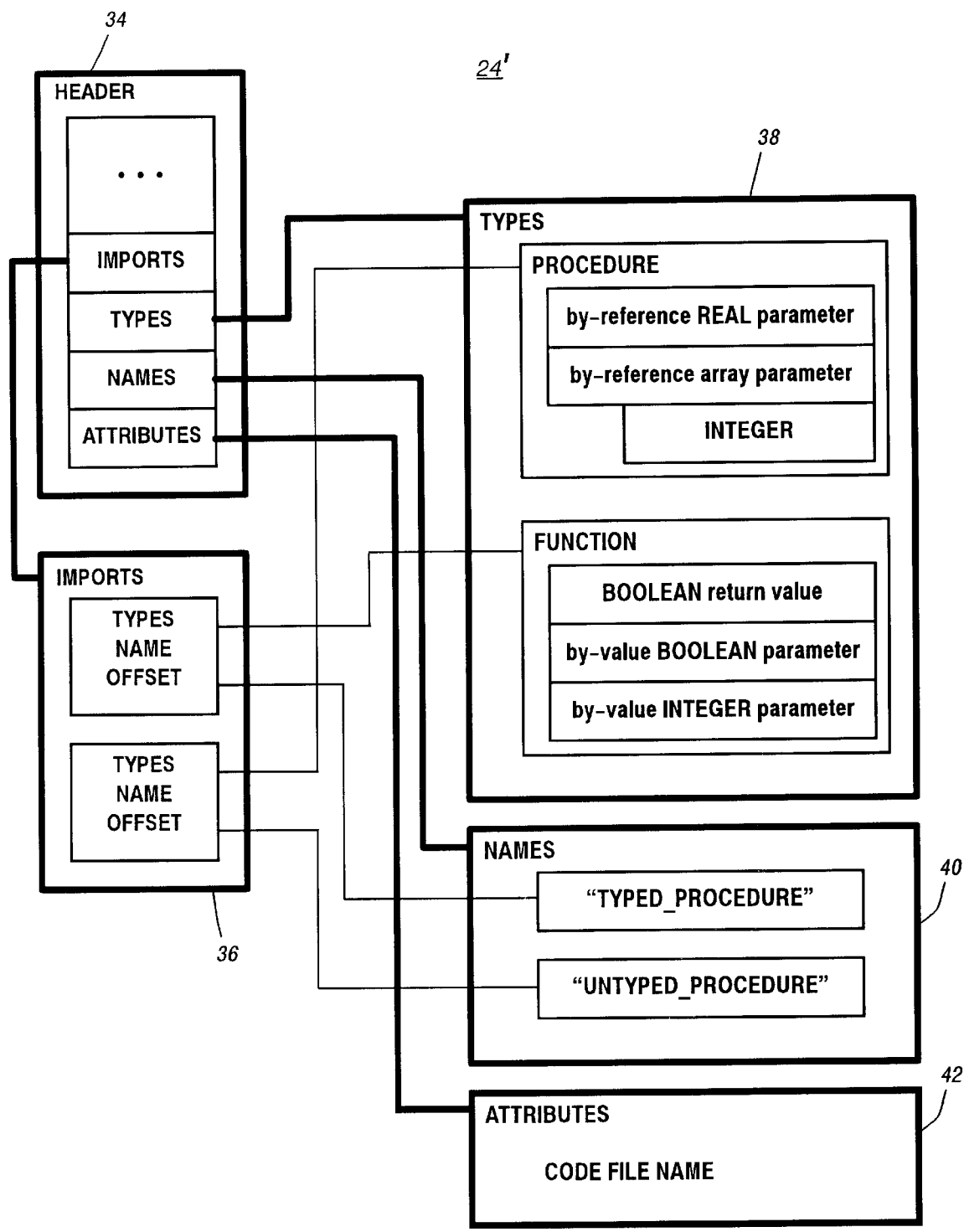
FIG. 4 is a graphical depiction of a template that is generated during compilation of an application program that calls one or more of the procedures exported by the dynamic link library of FIG. 2.

In greater detail, in a preferred embodiment of the linker 130 that can be used in the exemplary system illustrated in FIG. 5, the linker 130 further maintains a table of all Win32 DLLs in the second computing environment (i.e., the NT server environment) that are currently loaded. Each entry in the table contains: (1) the pathname of the Win32DLL code file, (2) a reference count of how many applications in the first computing environment (i.e., the MCP environment) have linked to it, and (3) the Win32 handle describing this instance of the DLL. In this preferred embodiment, when the linker 130 is invoked by the MCP operating system in order to link a calling application in the MCP environment to a Win32DLL in the NT server environment, the linker 130 receives two parameters from the MCP operating system: (1) a pointer to the template of the calling application (e.g., the template of FIG. 4); and (2) a pointer to the base of the program stack of the calling application which contains the declarations of the imported procedures. The steps of FIG. 13 are then performed, in greater detail, as follows:

1. (step 88 of FIG. 13) The linker 130 locates the attribute block in the template of the calling application and extracts the code file name from the DLLPATHNAME attribute. It then searches its internal table for this Win32DLL code file. If the linker finds that an entry already exists in the table for this Win32DLL, it increments the reference count to indicate that this application is linking to it, and then proceeds to step 3 below. If the code file name is not currently in its table, the linker 130 calls the Win32 LoadLibrary function passing the name of the code file as the parameter to it. If the LoadLibrary call succeeds, the linker 130 then creates an entry in its table for this DLL, stores the handle returned by the LoadLibrary call in the table entry and then proceeds to step 2 below. If the LoadLibrary call fails, the linker returns to the MCP with an error result indicating that the requested DLL could not be located.

2. (step 88 of FIG. 13, cont.) The linker 130 calls the Win32 GetProcAddress function passing it the name LOAD$. Recall from above, that LOAD$ is the name given to the prologue procedure, if any, provided in the second DLL. If the GetProcAddress call fails, the linker 130 assumes that there is no prologue procedure in this Win32DLL and proceeds to step 3 below. If the GetProcAddress call succeeds, the linker 130 calls the function returned. If this call succeeds, then the linker 130 proceeds to step 3 below. If the LOAD$ function call does not succeed, then the linker 130 performs error processing. Specifically, the linker 130 calls the Win32 function FreeLibrary for this Win32DLL, deletes the corresponding entry from its internal table, and returns an error to the MCP operating system indicating that the DLL could not be initialized.

3. The linker 130 now locates the import list in the template of the calling application and for each imported procedure proceeds as follows:
   3.1. (step 90 of FIG. 13) The linker 130 extracts the name of the imported procedure and appends a"$"to the end of it.
   3.2. (step 90 of FIG. 13) The linker 130 calls the Win32 GetProcAddress function passing it this name. If this call succeeds, the linker 130 proceeds to the next step (3.3), otherwise it goes back to step 3.1 and processes the next import.
   3.3. (steps 92–94 of FIG. 13) The linker now locates the type information for this imported procedure in the library template and calls the function returned by the GetProcAddress function in step 3.2 (which is the parameter matching routine in the Win32DLL ) passing a pointer to the type information as a parameter. If this call succeeds, then the parameters match, and an entry point to the interface jacket routine of the Win32DLL is returned to the linker. The linker 130 then proceeds to step 3.4 below. If the call to the parameter matching routine was unsuccessful, then the linker 130 indicates an error (step 96 of FIG. 13), and in this embodiment, control then passes back to step 3.1 to process the next import.
   3.4. The linker 130 now determines from the template of the calling application an offset in the stack (activation record) of the calling application for this imported procedure. Then, using the second parameter passed to the linker (the pointer to the base of the calling application's stack), the linker 130 locates and overwrites the original entry point for the imported procedure with the entry point of the interface jacket routine for the procedure in the Win32DLL (i.e., the entry point returned by the parameter matching routine in step 3.3).

When all imports have been processed, the linker 130 returns to the MCP.

In the preferred embodiment described above, it is also preferable to include a delinker (not shown) that is called by the MCP when the caller attempts to delink from the Win32DLL. The delinker accepts a single parameter which is a pointer to the template of the calling application. The delinker uses the same internal table used by the linker 130 to update information about the Win32DLL s that are currently loaded. When a calling application attempts to delink from a Win32DLL, the delinker functions as follows:

1. It locates the attribute block in the template of the calling application and extracts the code file name for the Win32DLL. It then searches the internal table for this DLL. If it does not find it, it returns an error to the MCP, otherwise it decrements the reference count in the table for this DLL and proceeds to step 2.
2. If the reference count is not zero, the linker returns to the MCP indicating a successful delink.
3. The delinker calls the Win32 GetProcAddress function passing it the name UNLOAD$. This is the name of the epilogue procedure, if any, contained in this particular Win32DLL. If the GetProcAddress call fails, the linker proceeds to step 4. If the GetProcAddress call succeeds, the delinker calls the UNLOAD$ function and then proceeds to step 4.

4. The delinker now calls the Win32 function FreeLibrary passing as a parameter the handle stored in the internal table for this instance of the Win32DLL.

5. The delinker then deletes the entry for this Win32DLL from the internal table and returns to the MCP.

IV. Other

The method of the present invention, and the code generator and linker that carry out that method, may be embodied in the form of program code (i.e., instructions) stored on a computer-readable medium, such as a floppy diskette, CD-ROM, DVD-ROM, DVD-RAM, hard disk drive, or any other machine-readable storage medium, wherein, when the program code is loaded into and executed by a machine, such as a computer, the machine becomes an apparatus for practicing the invention. The present invention may also be embodied in the form of program code that is transmitted as a signal over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits. When embodied as program code, the methods and apparatus of the present invention, including the code generator and linker, can be implemented in any high level procedural or object-oriented programming language, such as, for example, C or C++. Alternatively, the program code can be implemented in assembly or machine language if desired. In any case, the language may be a compiled or an interpreted language. In the presently preferred embodiment, the code generator and linker are implemented in the C++ programming language. When the code generator and linker are used in the exemplary system of FIG. 5, both of them preferably run in the NT server environment.

Microsoft, MSDN, Win32, Windows, and Windows NT are either registered trademarks or trademarks of Microsoft Corporation. Unisys and ClearPath are either registered trademarks or trademarks of Unisys Corporation.

As the foregoing illustrates, the present invention is directed to a method, apparatus, and computer program product for replacing a dynamic link library (DLL) of a first computing environment with a DLL of a second computing environment that can be invoked by a calling application in the first computing environment in a manner that is transparent to the calling application. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method for replacing a dynamic link library (DLL) of a first computing environment, which first DLL comprises a plurality of exported procedures and a directory that provides information concerning the exported procedures, each exported procedure having an interface, with a second DLL capable of executing in a second computing environment and capable of being called by an application executing in the first computing environment, said method comprising (a) generating, in the second computing environment, based on the information in the directory of the first DLL, a second DLL comprising a plurality of exported procedures each having an interface that is identical to the interface of a corresponding exported procedure in the first DLL but comprising native code of the second computing environment; and (b) linking an application executing in the first computing environment that contains calls to the exported procedures of the first DLL, to the corresponding exported procedures of the second DLL in the second computing environment in a manner that is transparent to the calling application.

2. The method recited in claim 1, wherein said generating step comprises:

(a1) retrieving from the directory of the first DLL information concerning each of its exported procedures; and (a2) generating a skeleton of said second DLL from the information retrieved from the directory of the first DLL, said skeleton of said second DLL comprising, for each procedure exported by the first DLL:

a parameter matching routine that, when invoked, verifies whether a calling application in the first computing environment was compiled with an interface description for the exported procedure that matches a corresponding interface description for that exported procedure in said second DLL;

an interface jacket routine that maps arguments of the exported procedure supplied by a calling application in the first computing environment into corresponding arguments that can be manipulated properly by said second DLL in the second computing environment; and a prototype declaration for the exported procedure;

(a3) inserting native program code of the second computing environment in the generated second DLL to define the functionality of each exported procedure of the second DLL within the second computing environment; and (a4) compiling the generated second DLL in the second computing environment.

3. The method recited in claim 2, wherein said linking step comprises:

(b1) locating and loading the second DLL in the second computing environment;

(b2) invoking the parameter matching routine for each exported procedure of the second DLL that is imported by the calling application; and (b3) if the parameter matching routine executes successfully, replacing an entry point in the first computing environment for the exported procedure of the first DLL with an entry point of the corresponding exported procedure in the second DLL.

4. The method recited in claim 1, wherein the first computing environment is emulated within the second computing environment.

5. Apparatus for replacing a dynamic link library (DLL) of a first computing environment, which first DLL comprises a plurality of exported procedures and a directory that provides information concerning the exported procedures, each exported procedure having an interface, with a second DLL capable of executing in a second computing environment and capable of being called by an application executing in the first computing environment, said apparatus comprising (a) a code generator that generates, in the second computing environment, based on the information in the directory of the first DLL, a second DLL comprising a plurality of exported procedures each having an interface that is identical to the interface of a corresponding exported procedure in the first DLL but comprising native code of the second computing environment; and (b) a linker that links an application executing in the first computing environment that contains calls to the exported procedures of the first DLL, to the corresponding exported procedures of the second DLL in the second computing environment in a manner that is transparent to the calling application.

6. The apparatus recited in claim 5, wherein the code generator comprises:

means for retrieving from the directory of the first DLL information concerning each of its exported procedures; and means for generating a skeleton of said second DLL from the information retrieved from the directory of the first DLL, said skeleton of said second DLL comprising, for each procedure exported by the first DLL:

a parameter matching routine that, when invoked, verifies whether a calling application in the first computing environment was compiled with an interface description for the exported procedure that matches a corresponding interface description for that exported procedure in said second DLL;

an interface jacket routine that maps arguments of the exported procedure supplied by a calling application in the first computing environment into corresponding arguments that can be manipulated properly by said second DLL in the second computing environment; and a prototype declaration for the exported procedure.

7. The apparatus recited in claim 6, wherein said linker locates and loads the second DLL in the second computing environment, invokes the parameter matching routine for each exported procedure of the second DLL that is imported by the calling application, and if the parameter matching routine executes successfully, replaces an entry point in the first computing environment for the exported procedure of the first DLL with an entry point of the corresponding exported procedure in the second DLL.

8. The apparatus recited in claim 5, wherein the first computing environment is emulated within the second computing environment.

9. A computer-readable medium having program code stored thereon that facilitates replacement of a dynamic link library (DLL) of a first computing environment, which first DLL comprises a plurality of exported procedures and a directory that provides information concerning the exported procedures, each exported procedure having an interface, with a second DLL capable of executing in a second computing environment and capable of being called by an application executing in the first computing environment, said program code, when executed, causing the following steps to be performed:

(a) generating, in the second computing environment, based on the information in the directory of the first DLL, a second DLL comprising a plurality of exported procedures each having an interface that is identical to the interface of a corresponding exported procedure in the first DLL but comprising native code of the second computing environment; and (b) linking an application executing in the first computing environment that contains calls to the exported procedures of the first DLL, to the corresponding exported procedures of the second DLL in the second computing environment in a manner that is transparent to the calling application.

10. The computer-readable medium recited in claim 9, wherein said program code causes, in said generating step, the following steps to be performed:

(a1) retrieving from the directory of the first DLL information concerning each of its exported procedures; and (a2) generating a skeleton of said second DLL from the information retrieved from the directory of the first DLL, said skeleton of said second DLL comprising, for each procedure exported by the first DLL:

a parameter matching routine that, when invoked, verifies whether a calling application in the first computing environment was compiled with an interface description for the exported procedure that matches a corresponding interface description for that exported procedure in said second DLL;

an interface jacket routine that maps arguments of the exported procedure supplied by a calling application in the first computing environment into corresponding arguments that can be manipulated properly by said second DLL in the second computing environment; and a prototype declaration for the exported procedure.

11. The method recited in claim 10, wherein said program code causes, in said linking step, the following steps to be performed:

(b1) locating and loading the second DLL in the second computing environment;

(b2) invoking the parameter matching routine for each exported procedure of the second DLL that is imported by the calling application; and (b3) if the parameter matching routine executes successfully, replacing an entry point in the first computing environment for the exported procedure of the first DLL with an entry point of the corresponding exported procedure in the second DLL.

12. The computer-readable medium recited in claim 9, wherein the first computing environment is emulated within the second computing environment, and wherein said program code executes in the second computing environment.

13. A method for generating, from a compiled dynamic link library code file of a first computing environment, a source code skeleton of a second dynamic link library (DLL) executable in a second computing environment and that can be linked to a calling application executing in the first computing environment as a replacement for the compiled dynamic link library code file of the first computing environment, wherein the compiled dynamic link library code file comprises a plurality of exported procedures, each having a defined interface, and a directory that provides information concerning each of the exported procedures, said method comprising:

(a) extracting from the directory of the compiled dynamic link library code file the information concerning each of its exported procedures; and (b) based on the extracted information, generating for each procedure exported by the compiled dynamic link library code file, as part of said source code skeleton of said second DLL:

a parameter matching routine that, when invoked, verifies whether a calling application in the first computing environment was compiled with an interface description for the exported procedure that matches a corresponding interface description for that exported procedure in said second DLL;

an interface jacket routine that maps arguments of the exported procedure supplied by the calling application in the first computing environment into corresponding arguments that can be manipulated properly by said second DLL in the second computing environment; and a prototype declaration for the exported procedure.

14. A computer-readable medium having program code stored thereon for generating, from a compiled dynamic link library code file of a first computing environment, a source code skeleton of a second dynamic link library (DLL) executable in a second computing environment and that can be linked to a calling application executing in the first computing environment as a replacement for the compiled dynamic link library code file of the first computing environment, wherein the compiled dynamic link library code file comprises a plurality of exported procedures, each having a defined interface, and a directory that provides information concerning each of the exported procedures, said program code, when executed, causing the following steps to be performed:

(a) extracting from the directory of the compiled dynamic link library code file the information concerning each of its exported procedures; and (b) based on the extracted information, generating for each procedure exported by the compiled dynamic link library code file, as part of said source code skeleton of said second DLL:

a parameter matching routine that, when invoked, verifies whether a calling application in the first computing environment was compiled with an interface description for the exported procedure that matches a corresponding interface description for that exported procedure in said second DLL;

an interface jacket routine that maps arguments of the exported procedure supplied by the calling application in the first computing environment into corresponding arguments that can be manipulated properly by said second DLL in the second computing environment; and a prototype declaration for the exported procedure.

* * * * *